(12) United States Patent
Kim et al.

(10) Patent No.: US 11,551,671 B2
(45) Date of Patent: Jan. 10, 2023

(54) ELECTRONIC DEVICE AND METHOD OF CONTROLLING THEREOF

(71) Applicant: SAMSUNG ELECTRONICS CO., LTD., Suwon-si (KR)

(72) Inventors: Chanwoo Kim, Suwon-si (KR); Jiyeon Kim, Suwon-si (KR); Kyungmin Lee, Suwon-si (KR); Changwoo Han, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 373 days.

(21) Appl. No.: 16/872,559

(22) Filed: May 12, 2020

(65) Prior Publication Data
US 2020/0365141 A1 Nov. 19, 2020

Related U.S. Application Data

(60) Provisional application No. 62/848,698, filed on May 16, 2019.

(30) Foreign Application Priority Data

Mar. 23, 2020 (KR) ........................ 10-2020-0035184

(51) Int. Cl.
G10L 15/16 (2006.01)
G10L 15/08 (2006.01)
(Continued)

(52) U.S. Cl.
CPC ............ *G10L 15/16* (2013.01); *G10L 15/063* (2013.01); *G10L 15/083* (2013.01); *G10L 25/60* (2013.01)

(58) Field of Classification Search
CPC ..... G10L 15/16; G10L 15/063; G10L 15/083; G10L 25/60; G10L 15/00; G10L 21/02; G10L 25/30
(Continued)

(56) References Cited

U.S. PATENT DOCUMENTS 5,680,481 A 10/1997 Prasad et al.
7,912,713 B2 3/2011 Vair et al.
(Continued)

FOREIGN PATENT DOCUMENTS

CN 110738990 1/2020
JP 5050180 10/2012
(Continued)

OTHER PUBLICATIONS

European Search Report dated Oct. 14, 2021 in corresponding European Application No. 20806513.6.
(Continued)

*Primary Examiner* — Akwasi M Sarpong
(74) *Attorney, Agent, or Firm* — Nixon & Vanderhye P.C.

(57) ABSTRACT

An electronic device and a method for controlling the electronic device are disclosed. The electronic device of the disclosure includes a microphone, a memory storing at least one instruction, and a processor configured to execute the at least one instruction. The processor, by executing the at least one instruction, is configured to: obtain second voice data by inputting first voice data input via the microphone to a first model trained to enhance sound quality, obtain a weight by inputting the first voice data and the second voice data to a second model, and identify input data to be input to a third model using the weight.

18 Claims, 7 Drawing Sheets

(51) Int. Cl.
*G10L 25/60* (2013.01)
*G10L 15/06* (2013.01)

(58) Field of Classification Search
USPC .......................................................... 704/232
See application file for complete search history.

(56) References Cited

U.S. PATENT DOCUMENTS

| | | | |
|---|---|---|---|
| 8,131,543 B1* | 3/2012 | Weiss | G10L 25/78 |
| | | | 704/226 |
| 8,194,865 B2 | 6/2012 | Goldstein et al. | |
| 9,697,826 B2 | 7/2017 | Sainath et al. | |
| 10,046,229 B2* | 8/2018 | Tran | A63B 71/145 |
| 10,453,460 B1* | 10/2019 | Wightman | G10L 15/26 |
| 10,593,347 B2* | 3/2020 | Baek | G10L 21/0232 |
| 10,818,309 B2 | 10/2020 | Lee et al. | |
| 2008/0140396 A1 | 6/2008 | Grosse-Schulte et al. | |
| 2011/0125496 A1 | 5/2011 | Asakawa et al. | |
| 2015/0255083 A1 | 9/2015 | Krini et al. | |
| 2015/0287406 A1* | 10/2015 | Kristjansson | G10L 15/20 |
| | | | 704/233 |
| 2017/0154636 A1* | 6/2017 | Geiger | G10L 21/0272 |
| 2018/0012616 A1* | 1/2018 | Salishev | H04R 1/04 |
| 2018/0197534 A1* | 7/2018 | Li | G10L 15/20 |
| 2019/0019050 A1 | 1/2019 | Roblek et al. | |
| 2020/0027450 A1 | 1/2020 | Zhu et al. | |
| 2020/0184985 A1* | 6/2020 | Nesta | G10L 21/0272 |
| 2020/0211580 A1* | 7/2020 | Lee | G10L 21/0216 |
| 2021/0065731 A1* | 3/2021 | Matsukawa | G10K 11/17873 |

FOREIGN PATENT DOCUMENTS

| | | |
|---|---|---|
| KR | 10-2019-0094316 | 8/2019 |
| KR | 10-2137151 | 7/2020 |
| WO | 2018/147687 | 8/2018 |

OTHER PUBLICATIONS

Ochiai Tsubasa et al: "Speaker Adaptation 1-15 for Multichannel End-to-End Speech Recognition", 2018 IEEE International Conference on Acoustics, Speech and Signal Processing (ICASSP). IEEE, Apr. 15, 2018 (Apr. 15, 2018), pp. 6707-6711, XP033401479.

Seyedmahdad Mirsamadi et al: "Causal Speech Enhancement Combining Data-Driven Learning and Suppression Rule Estimation", Interspeech 2016, vol. 2016, Sep. 12, 2016 (Sep. 12, 2016), pp. 2870-2874, XP055609994.

International Search Report and Written Opinion dated Aug. 11, 2020 in corresponding International Application No. PCT/KR2020/006231.

* cited by examiner

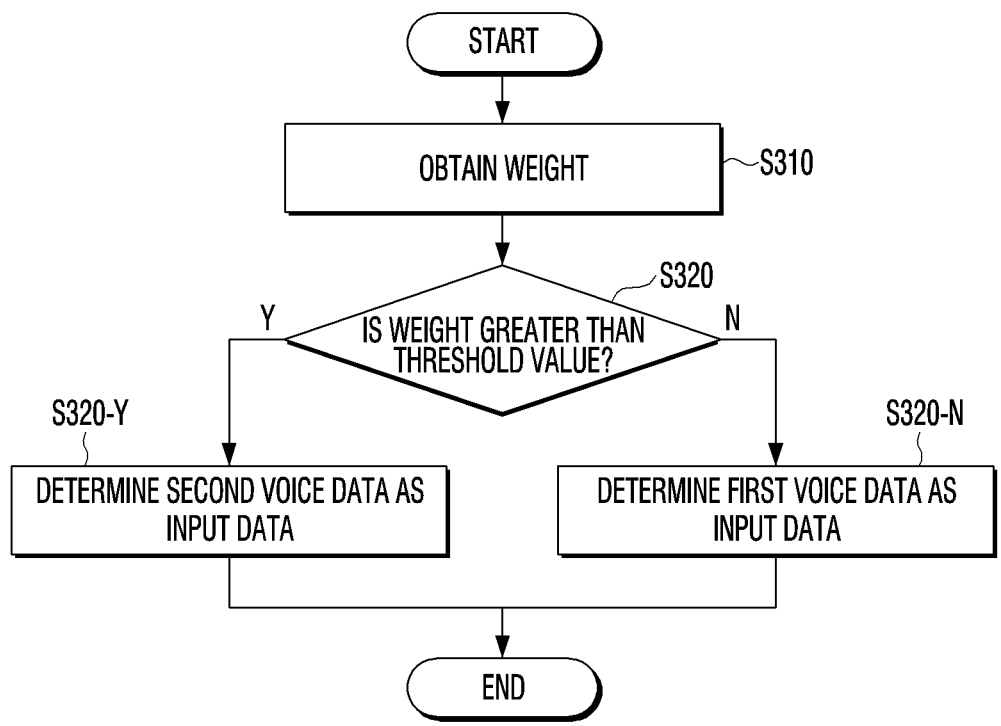

ELECTRONIC DEVICE AND METHOD OF CONTROLLING THEREOF

CROSS-REFERENCE TO RELATED APPLICATIONS

This application is based on and claims priority under 35 U.S.C. § 119 to U.S. Provisional Patent Application Ser. No. 62/848,698, filed on May 16, 2019, in the U.S. Patent and Trademark Office, and Korean Patent Application No. 10-2020-0035184, filed on Mar. 23, 2020, in the Korean Intellectual Property Office, the disclosures of which are incorporated by reference herein in their entireties.

BACKGROUND

1. Field

The disclosure relates to an electronic device and a method for controlling the electronic device, and for example, to an electronic device determining data to be input to a specific model based on voice data and data obtained by applying an algorithm for enhancing sound quality to the voice data, and a method for controlling the electronic device.

2. Description of Related Art

Various algorithms (e.g., algorithm for filtering out a noise included in a voice signal, a beamforming-based algorithm, an algorithm for mapping features based on a neural network, and the like) have been developed and used conventionally in order to enhance sound quality of a voice.

When the algorithm for enhancing sound quality is applied to a user voice input in a normal noisy environment, the sound quality of the voice may be enhanced. However, if the algorithm for enhancing sound quality is applied to a user voice input in a clean environment with comparatively less noise or substantially no noise, the sound quality of the voice may be deteriorated.

In other words, the conventional enhancement algorithm maps input data to target data to minimize or maximize a determined object function, but does not measure a degree of reliability of mapped output data. Accordingly, the enhancement algorithm may deteriorate rather than enhance the sound quality of voice in specific situations.

SUMMARY

Embodiments of the disclosure provide an electronic device determining input data to be input to a specific model based on voice data and output data obtained by inputting the voice data to a model for enhancing sound quality, and a method for controlling the electronic device.

According to an example embodiment of the disclosure, an electronic device is provided, the electronic device including: a microphone, a memory storing at least one instruction, and a processor configured to execute the at least one instruction, in which the processor is configured, by executing the at least one instruction, to: obtain second voice data by inputting first voice data input via the microphone to a first model trained to enhance sound quality, obtain a weight by inputting the first voice data and the second voice data to a second model, and identify input data to be input to a third model using the weight.

According to another example embodiment of the disclosure, a method for controlling an electronic device comprising a microphone, the method comprising: obtaining second voice data by inputting first voice data input via the microphone to a first model trained to enhance sound quality, obtaining a weight by inputting the first voice data and the second voice data to a second model, and identifying input data to be input to a third model using the weight.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIGS. 3 and 4 are flowcharts illustrating example processes of determining input data using an obtained weight by the electronic device according to an embodiment;

DETAILED DESCRIPTION

The disclosure is made in view of the needs described above and the disclosure provides an electronic device determining input data to be input to a specific model based on voice data and output data obtained by inputting the voice data to a model for enhancing sound quality, and a method for controlling the electronic device.

Figure 1:
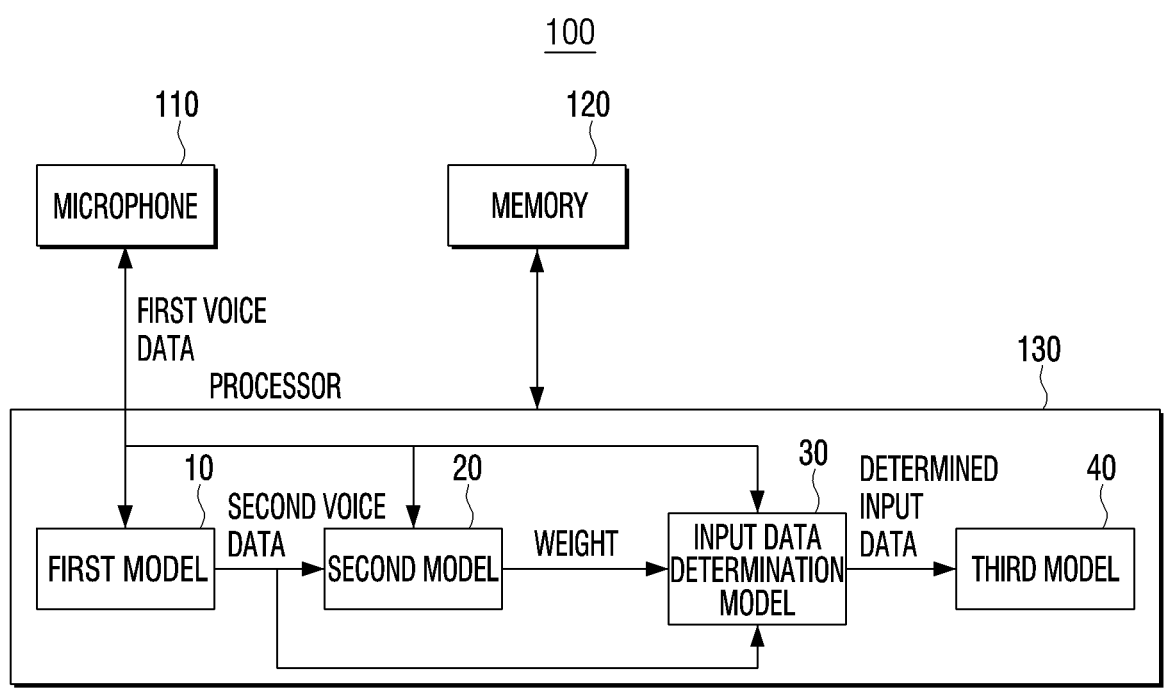
FIG. 1 is a block diagram illustrating an example configuration and operations of an electronic device according to an embodiment.

An electronic device 100 shown in FIG. 1 may determine (e.g., identify) input data to be input to a specific model based on first voice data input via a microphone 110 and second voice data obtained by applying an algorithm for enhancing sound quality to the first voice data. If the algorithm for enhancing sound quality is applied to the first voice data input via the microphone 110 in a clean environment, the sound quality of the first voice data may be relatively deteriorated. Thus, the electronic device 100 may execute a process of determining voice data to be input to a specific model based on the first voice data and the second voice data. The process of determining (e.g., identifying) the voice data to be input to a specific model by the electronic device 100 will be described in greater detail below.

Hereinafter, example embodiments of the disclosure will be described in greater detail with reference to the accompanying drawings.

FIG. 1 is a diagram illustrating an example configuration of an example electronic device and to aid in describing example operations of the electronic device according an embodiment of the disclosure. As shown in FIG. 1, the electronic device 100 may include a microphone 110, a memory 120, and a processor (e.g., including processing circuitry) 130. However, the configuration shown in FIG. 1 is an example for implementing the embodiments of the disclosure, and suitable hardware or software components apparent to those skilled in the art may be additionally added to the electronic device 100.

The microphone 110 may, for example, be a component for receiving a voice from a user. The microphone 110 may receive the first voice data from a user. The first voice data may be affected by a surrounding environment since it is voice data input through utterance of a user from the outside of the electronic device 100. Accordingly, the first voice data input in an environment with a lot of noise may have interference and reverberation effects due to noises, and the first voice data input in a clean environment with comparatively less noise may have comparatively less interference and reverberation effects due to noises. A term "user" may refer to a person using the electronic device or an apparatus (e.g., an artificial intelligence electronic apparatus) using an electronic device.

The microphone 110 may be provided in the electronic device 100 or may be provided outside and electrically connected to the electronic device 100. In addition, if the microphone 110 is provided outside, the microphone 110 may transmit a user voice signal generated via a wired or wireless interface (e.g., Wi-Fi or Bluetooth) to the processor 130.

The memory 120 may store instructions or data related to at least another component of the electronic device 100. The instruction may refer, for example, to an action statement directly executed by the processor 130 in a program writing language and may including, for example, a minimum unit of the execution or action of the program. The memory 120 may be accessed by the processor 130 and reading, recording, editing, deleting, or updating of the data by the processor 130 may be executed.

The memory 120 may store models which are able to execute various functions. For example, the memory 120 may store a first model 10, a second model 20, an input data determination model 30, and a third model 40 and each model may be controlled/executed by the processor 130. The various models disclosed and described herein may include, for example, processing circuitry and/or executable program elements executed by the processing circuitry.

The first model 10 may, for example, be a model that applies the algorithm for enhancing sound quality to the first voice data input via the microphone 110. Accordingly, the first model 10 may output the second voice data by applying the algorithm for enhancing sound quality to the first voice data input via the microphone 110 under the control of the processor 130. The first model 10 may be implemented as a model that applies an algorithm for filtering out a noise or a beamforming-based algorithm to the first voice data. In another example, the first model 10 may be implemented as a neural network model (e.g., Gaussian mixture model (GMM)) that executes an algorithm for removing various noises and adjusting reverberation.

The second model 20 may, for example, be a neural network model trained to output a weight, when the second voice data and the first voice data is input under the control of the processor 130. The weight may refer, for example, to a parameter for adjusting an effect of input data applied to the output data and may be an element that is able to determine (e.g., identify) input data to be input to the third model 40.

In an embodiment of the disclosure, in response to the first voice data and the second voice data being input, the trained second model 20 may obtain an estimated value of, for example, a mean square error between the second voice data and clean voice data corresponding to the first voice data. The trained second model 20 may output a weight based on the obtained estimated value of the mean square error, the first voice data, and the second voice data. The clean voice data may refer, for example, to voice data input in a clean environment with no external effect such as a noise.

The estimated value of the mean square error between the second voice data and the clean voice data corresponding to the first voice data may be inversely proportional to reliability of the second voice data. A large estimated value of the mean square error may imply a large difference between the second voice data and the clean voice data corresponding to the first voice data, and accordingly, the higher estimated value of the error may imply lower reliability of the second voice data.

The second model 20 may be trained using a value of the mean square error between the clean voice data corresponding to the first voice data and the second voice data as learning data under the control of the processor 130. The process of training the second model 20 based on the value of the mean square error under the control of the processor 130 will be described in greater detail below with reference to FIG. 2A.

In another embodiment of the disclosure, in response to the first voice data and the second voice data being input, the second model 20 may obtain an estimated value of a difference between a first score corresponding to the first voice data and a second score corresponding to the second voice data. In addition, the second model 20 may output a weight based on the obtained estimated value of the difference between the first score and the second score. For example, the second model 20 may obtain a weight by applying a predefined mapping function to the estimated value of the difference between the first score and the second score.

The first score corresponding to the first voice data and the second score corresponding to the second voice data may include data to be output when the first voice data and the second voice data are respectively input to the third model 40. For example, the score corresponding to each voice data may be variously implemented according to the third model 40. For example, if the third model 40 includes an Automatic Speech Recognition (ASR) model (e.g., including processing circuitry and/or executable program elements executed by the processing circuitry), the score may be voice reliability or a world error rate (WER). If, for example, the third model 40 is a wake-up model, the score may be a possibility for activation of a dialogue system.

The second model 20 may be trained using the estimated value of the difference between the first score and the second score as learning data under the control of the processor 130. The process of training the second model 20 based on the estimated value of the difference between the first score and the second score under the control of the processor 130 will be described in greater detail below with reference to FIG. 2B.

The input data determination model 30 may, for example, be a model that determines (e.g., identifies) input data using at least one of the first voice data, the second voice data, and the weight. For example, the input data determination model 30 may linearly combine the first voice data and the second voice data based on the weight and determine (e.g., identify) the linearly combined value as input data. In another example, the input data determination model 30 may determine (e.g., identify) one of the first voice data and the second voice data as input data based on the weight.

In still another example, if the weight is greater than a first threshold value, the input data determination model 30 may determine (e.g., identify) the second voice data as the input data. If the weight is greater than a second threshold value and less than the first threshold value, the input data determination model 30 may determine (e.g., identify) a linearly combined value of the first voice data and the second voice data as input data based on the weight. If the weight is less than the second threshold value, the input data determination model 30 may determine (e.g., identify) the first voice data as input data. The first threshold value and the second threshold value may, for example, be values for determining to which data of the first voice data and the second voice data the data to be input to the third model 40 is similar, may, for example, be a value predetermined by an experiment, and may, for example, be changed by a user.

The third model 40 may, for example, be a model to which the input data determined (e.g., identified) by the input data determination model 30 is input. The third model 40 may be implemented, for example, and without limitation, as a wake-up model, an ASR model, or the like. However, this is merely an example, and the third model may be variously implemented according to a type of the electronic device 100, a type of input data, and user commands, and the like. The wake-up model may, for example, be a model that wakes up or activates a dialogue system that is able to execute natural language processing, when the wake-up model determines (e.g., identifies) that a user voice input via the microphone 110 includes a wake-up word. The automatic speech recognition model may, for example, be a model that executes speech recognition with respect to a user voice input via the microphone 110 and outputs a text corresponding to the recognized voice.

The first model 10, the second model 20, the input data determination model 30, and the third model 40 may be stored in a non-volatile memory and may be loaded to a volatile memory under the control of the processor 130, when the dialogue system is activated. In another embodiment, each model may be loaded to a volatile memory under the control of the processor 130, when a user voice is input via the microphone 110. The loading may refer, for example, to an operation of invoking and storing data stored in the non-volatile memory in a volatile memory so that the processor 130 may access the data. A case where the dialogue system is activated may include a case where the dialogue system is stored in a non-volatile memory and loaded to a volatile memory under the control of the processor 130.

FIG. 1 illustrates an example embodiment in which each model is loaded to a volatile memory from a non-volatile memory and the volatile memory is included as a component of the processor 130. However, this is merely an example and the volatile memory may be implemented as a component separately from the processor 130. The volatile memory may include, for example, a memory that is able to maintain stored information, even if the power supply is stopped. For example, the non-volatile memory 120 may include at least one of a flash Memory, a programmable read-only memory (PROM), a magnetoresistive random-access memory (MRAM), and a resistive RAM (RRAM). The volatile memory may include, for example, a memory that needs continuous power supply for maintaining stored information. For example, the volatile memory may include at least one of a dynamic random-access memory (DRAM) and a static RAM (SRAM).

The processor 130 may include various processing circuitry and is electrically connected to the memory 120 and may control general operations of the electronic device 100. For example, the processor 130 may obtain the second voice data by inputting the first voice data input via the microphone 110 to the first model 10 trained to enhance sound quality, by executing at least one instruction stored in the memory 120. For example, the processor 130 may obtain the second voice data by applying the algorithm for enhancing sound quality to the first voice data through the first model 10.

In addition, the processor 130 may obtain the weight by inputting the first voice data and the second voice data to the pre-trained second model 20.

In an embodiment of the disclosure, the processor 130 may obtain an estimated value of a mean square error between the second voice data and the clean voice data corresponding to the first voice data through the second model 20. The estimated value of the mean square error of the clean voice data corresponding to the first voice data and the second voice data obtained through the second model 20 may be expressed as the following mathematical formula 1.

$$v_i = E[(\hat{x}_i - x_i)^2],$$ [Mathematical Formula 1]

In the mathematical formula 1, x represents the clean voice data corresponding to the first voice data, hat{x} represents the second voice data, and v represents the estimated value of the mean square error. v, x, and hat{x} may be implemented in a form of a tensor that is a multi-dimensional matrix and the mathematical formula 1 is a formula for an i-th component of the tensor.

The processor 130 may obtain a weight based on the first voice data, the second voice data, and the estimated value of the error. For example, the processor 130 may obtain a weight based on the first voice data, the second voice data, and the estimated value of the error through the second model 20. The weight obtained by the processor 130 may, for example, be a weight value for minimizing and/or reducing the difference between the input data determined (e.g., identified) to be input to the third model 40 and the clean voice data corresponding to the first voice data, and the formula for obtaining this weight may be implemented as the following mathematical formula 2. The weight may be a value of 0 to 1.

$$\hat{w}_i \approx \frac{(y_i - \hat{x}_i)^2}{(y_i - \hat{x}_i)^2 + v_i^2}.$$ [Mathematical Formula 2]

In the mathematical formula 2, w represents the weight value, y represents the first voice data, hat{x} represents the second voice data, and v represents the estimated error value. w, y, and hat{x} may be implemented in a form of tensor and the mathematical formula 2 is a formula for an i-th component of the tensor. With the mathematical formula 3, the weight of the mathematical formula 2 may be derived to be a weight for minimizing and/or reducing the difference between the input data determined (e.g., identified) to be input to the third model and the clean voice data corresponding to the first voice data.

$$\begin{aligned}\xi_i &= E[(z_i - x_i)^2] \\ &= E[[(w_i \hat{x}_i + (1 - w_i)y_i) - x_i]^2] \\ &= E[(w_i(\hat{x}_i - x_i) + (1 - w_i)(y - x_i))^2] \\ &= \begin{aligned}w_i^2 E[(\hat{x}_i - x_i)^2] + (1 - w_i)^2 (y_i - x_i)^2 \\ + 2w_i(1 - w_i)(y_i - x_i)E[(\hat{x}_i - x_i)]\end{aligned}\end{aligned}$$ [Mathematic Formula 3]

ore example, referring to the mathematical formula 3, ε represents a value of a mean square error between the z which is the input data determined (or, identified) to be input to the third model and the clean voice data corresponding to the first voice data. The input data z may be expressed as a formula shown in the mathematical formula 8 which will be described below. As shown in FIG. 3, the input data z may be a value obtained by linear combination of the second voice data and the first voice data based on the weight. ε z, x, y, and hat{x} may be implemented in a form of tensor and the mathematical formula 3 is a formula for an i-th component of the tensor.

If the estimated value of the mean square error between the second voice data and the clean voice data corresponding to the first voice data is obtained by unbiased estimation, a value of ε may be expressed as the following mathematical formula 4.

$$\xi_i = w_i^2 E[(\hat{x}_i - x_i)^2] + (1 - w_i)^2 (y_i - x_i)^2 \qquad \text{[Mathematical Formula 4]}$$

The mathematical formula 4 is a quadratic formula regarding the weight and a weight for minimizing and/or reducing the value of ε may be expressed as the mathematical formula 5.

$$\hat{w}_i \approx \frac{(y_i - x_i)^2}{(y_i - x_i)^2 + E[(\hat{x}_i - x_i)^2]}. \qquad \text{[Mathematical Formula 5]}$$

If it is not a training process of the first model 10 and the second model 20, the clean voice data corresponding to the first voice data is not identified, and accordingly, the electronic device 100 may use a formula in the following mathematical formula 6, not the formula in the mathematical formula 5. The following mathematical formula 6 may be expressed in the same manner as the mathematical formula 2.

$$\hat{w}_i \approx \frac{(y_i - \hat{x}_i)^2}{(y_i - \hat{x}_i)^2 + E[(\hat{x}_i - x_i)^2]}. \qquad \text{[Mathematical Formula 6]}$$

In order to derive the mathematical formula 6, the following mathematical formula 7 is assumed.

$$(y_i - x_i)^2 \approx (y_i - \hat{x}_i)^2 \qquad \text{[Mathematical Formula 7]}$$

In another embodiment of the disclosure, the processor 130 may obtain the estimated value of the difference between the first score and the second score through the second model 20. Each of the first score and the second score is data obtained when each of the first voice data and the second voice data is input to the third model 40. The processor 130 may obtain a weight by applying a predefined mapping function to the estimated value of the difference between the first score and the second score.

For example, the third model 40 may be implemented as an ASR model and the score corresponding to the voice data may be, for example, a word error rate (WER). The processor 130 may obtain an estimated value of a difference between a first word error rate and a second word error rate by inputting the first voice data and the second voice data to the second model 20. The first and second word error rates may be word error rates output when each of the first and second voice data is input to the ASR model. The processor 130 may obtain a weight by applying the mapping function to the estimated value of the difference between the first word error rate and the second word error rate through the second model 20.

The processor 130 may determine (e.g., identify) input data to be input to the third model 40 using the obtained weight through the input data determination model 30. In an embodiment, the processor 130 may linearly combine the first voice data and the second voice data based on the weight and determine (e.g., identify) the linearly combined data as the input data through the input data determination model 30. The linearly combined value obtained by processor 130 may be expressed as the following mathematical formula 8. In the mathematical formula 8, Z represents linearly combined value, W represents a weight, y represents the first voice data, and hat{x} represents the second voice data. In other words, the processor 130 may obtain optical input data to be input to the third model using linear interpolation.

$$z = w \odot \hat{x} + (1 - w) \odot y. \qquad \text{[Mathematical Formula 8]}$$

The electronic device 100 may determine (e.g., identify) to which data of the first voice data and the second voice data the input data to be input to the third model is more similar, through the mathematical formula 2 and the mathematical formula 8. For example, when the estimated value (v) of the error increases, the weight value becomes close to 0, the input data value may be data more similar to the first voice data. For example, if the reliability of the second voice data decreases due to an increase in estimated error value, the electronic device 100 may determine (e.g., identify) data similar to the first voice data as the input data. When the estimated error value decreases, the weight value becomes close to 1, and accordingly, the input data value may be data more similar to the second voice data. In other words, the reliability of the second voice data increases due to a decrease in estimated error value, and accordingly, the electronic device 100 may determine (e.g., identify) data similar to the second voice data as the input data.

In another example, the processor 130 may determine (e.g., identify) one of the first voice data and the second voice data as the input data based on the weight using the input data determination model 30. For example, if the weight is greater than a threshold value, the processor 130 may determine (e.g., identify) the second voice data as the input data. In another example, if the weight is less than the threshold value, the processor 130 may determine (e.g., identify) the first voice data as the input data.

In still another example, if the weight is greater than the first threshold value, the processor 130 may determine (e.g., identify) the second voice data as the input data, and if the weight is less than the second threshold value, the processor 130 may determine (e.g., identify) the first voice data as the input data using the input data determination model 30. If the weight is greater than the second threshold value and less than the first threshold value, the processor 130 may linearly combine the first voice data and the second voice data based on the weight and determine (e.g., identify) the linearly combined value as the input data.

The processor 130 may obtain a result with which a specific function may be executed by inputting the determined (e.g., identified) input data to the third model 40. For example, if the third model is a wake-up model that recognizes a trigger voice in user voices that is able to wake up a dialogue system and the first voice data is data corresponding to the trigger voice, the processor 130 may obtain a signal for waking up the dialogue system by inputting the determined (e.g., identified) input data to the wake-up model. In another example, if the third model is the ASR model, the processor 130 may recognize a voice input to a user by inputting the determined (e.g., identified) input data to the ASR model.

The processor 130 may train the second model 20 using learning data. The learning data may be the estimated value of the mean square error between the clean voice data corresponding to the first voice data and the second voice data. In still another example, the learning data may be the estimated value of the difference between the first score and the second score. The process of training the second model 20 by the processor 130 using the learning data will be described in greater detail below with reference to FIG. 2A and FIG. 2B.

In the disclosure, the processor 130 may include one or a plurality of processors. The one or the plurality of processors 130 may be a general-purpose processor such as a central processing unit (CPU) or an application processor (AP), a graphic dedicated processor such as graphics-processing unit (GPU) or a visual processing unit (VPU), or an artificial intelligence processor such as a neural processing unit (NPU), or the like, but is not limited thereto.

The function related to the artificial intelligence according to the disclosure may be operated by the memory 120 and the processor 130. The one or the plurality of processors 130 may perform control to process the input data according to a predefined action rule stored in the memory 120 or an artificial intelligence model. The predefined action rule or the artificial intelligence model is formed through training. The forming through training herein may refer, for example, to forming a predefined action rule or an artificial intelligence model having a desired feature by applying a training algorithm to a plurality of pieces of learning data. Such training may be performed in a device demonstrating artificial intelligence according to the disclosure or performed by a separate server or system.

A function related to the artificial intelligence according to the disclosure may be operated by a processor and a memory. The processor may include one or a plurality of processors. The one or the plurality of processors may be a general-purpose processor such as a CPU, AP, or a digital signal processor (DSP), a graphic dedicated processor such as a GPU or a VPU, or an artificial intelligence processor such as a NPU, or the like, but is not limited thereto. The one or the plurality of processors may perform control to process the input data according to a predefined action rule stored in the memory or the artificial intelligence model. In addition, if the one or the plurality of processors are artificial intelligence dedicated processors, the artificial intelligence dedicated processor may be designed to have a hardware structure specialized in processing of a specific artificial intelligence model.

The predefined action rule or the artificial intelligence model may be formed through training. The forming through training herein may refer, for example, to forming a predefined action rule or an artificial intelligence model set to execute a desired feature (or object) by training a basic artificial intelligence model using a plurality of pieces of learning data by the training algorithm. Such training may be performed in a device demonstrating artificial intelligence according to the disclosure or performed by a separate server or system. Examples of the learning algorithm include a supervised learning, unsupervised learning, semi-supervised learning, or reinforcement learning, but is not limited to these examples.

The artificial intelligence model may include a plurality of neural network layers. The plurality of neural network layers have a plurality of weight values, respectively, and execute neural network processing through a processing result of a previous layer and processing between the plurality of weights. The plurality of weights of the plurality of neural network layers may be optimized and/or improved by the training result of the artificial intelligence model. For example, the plurality of weights may be updated to reduce or to minimize and/or reduce a loss value or a cost value obtained by the artificial intelligence model during the training process. The artificial neural network may include, for example, and without limitation, a convolutional neural network (CNN), deep neural network (DNN), recurrent neural network (RNN), restricted Boltzmann machine (RBM), deep belief network (DBN), bidirectional recurrent deep neural network (BRDNN), deep Q-network, or the like, but there is no limitation to these examples.

Figure 2A:
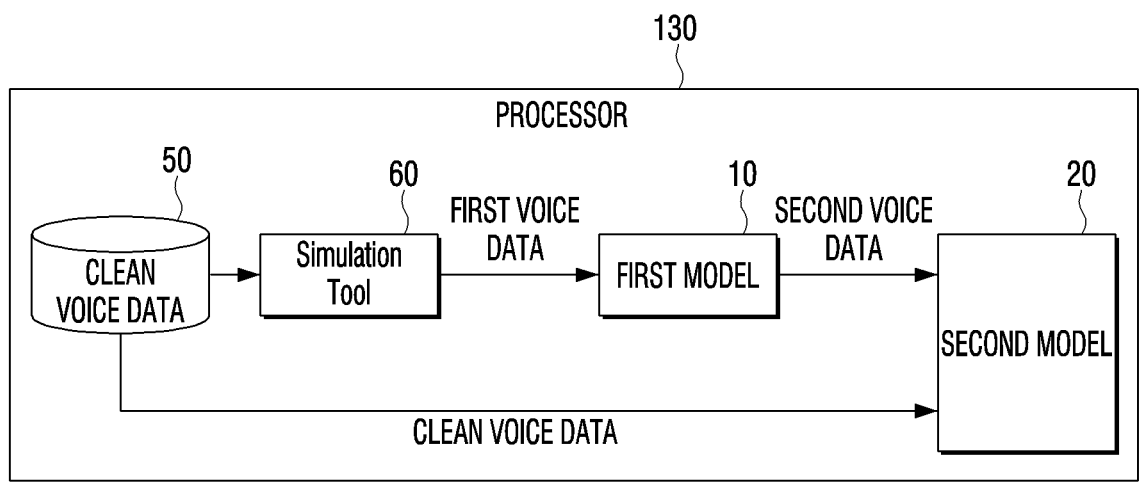
FIGS. 2A and 2B are block diagrams illustrating example processes of training a second model by the electronic device according to an embodiment.
Figure 2B:
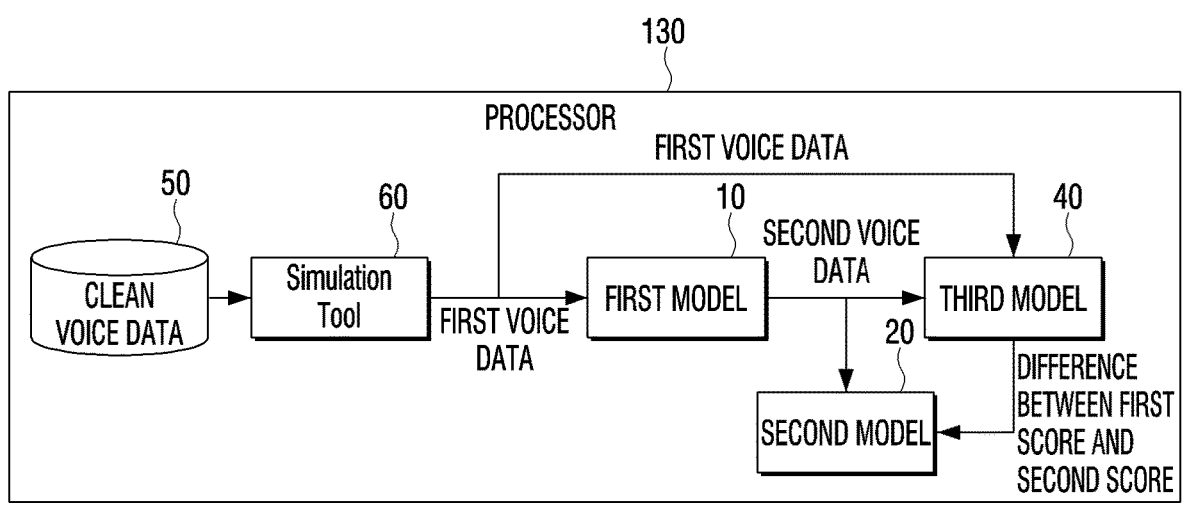

FIGS. 2A and 2B are block diagrams illustrating example processes of training the second model 20 by the processor 130 of the electronic device 100 according to an embodiment of the disclosure. FIGS. 2A and 2B are diagrams illustrating a case where each model and data are loaded to a volatile memory. FIGS. 2A and 2B shows a case where the volatile memory is included as a component of the processor 130, but this is merely an example, and the volatile memory may be a component separated from the processor 130.

In an embodiment of the disclosure, as shown in FIG. 2A, the processor 130 may train the second model 20 based on an estimated value of a mean square error between clean voice data 50 corresponding to the first voice data and the second voice data. For example, the processor 130 may obtain first voice data by inputting the clean voice data 50 to a simulation tool (e.g., including processing circuitry and/or executable program elements) 60. The clean voice data 50 may be predetermined data for training the second model 20 and may be voice data without any external effect such as a noise. The simulation tool 60 may, for example, be a model that outputs first voice data for training the second model 20 by applying an external effect such as a noise to the clean voice data 50. Accordingly, the first voice data output by the simulation tool 60 may be similar to the first voice data input via the microphone 110.

The processor 130 may obtain a value of a mean square error between the clean voice data corresponding the first voice data and the second voice data through the second model 20. For example, the second model 20 may obtain a value of the mean square error using the mathematical formula 1. v in the mathematical formula 1 may be the value of the mean square error between the clean voice data corresponding to the first voice data and the second voice data.

The processor 130 may obtain an estimated value of the mean square error between the clean voice data corresponding to the first voice data and the second voice data by inputting the first voice data and the second voice data to the second model 20. The processor 130 may obtain a difference between the value of the mean square error obtained in advance and the estimated value of the mean square error between the clean voice data corresponding to the first voice data and the second voice data. The processor 130 may train the second model 20 to output an optimal and/or improved estimated value so as to minimize and/or reduce a difference between the obtained value of the mean square error and the estimated value of the mean square error between the clean voice data corresponding to the first voice data and the second voice data.

When the first voice data and the second voice data are input under the control of the processor 130, the second model 20 trained in advance may obtain the optimized and/or improved estimated value of the mean square error between the clean voice data corresponding to the first voice data and the second voice data.

In another embodiment of the disclosure, referring to FIG. 2B, the processor 130 may train the second model 20 based on a difference between the first score and the second score. The process in which the processor 130 obtains the first voice data using the clean voice data through the simulation tool 60 has been described with reference to FIG. 2A, and thus the overlapped description will be omitted. For example, the processor 130 may obtain the first score and the second score respectively corresponding to the first voice data and the second voice data by individually inputting each of the first voice data and the second voice data to the third model 40. The processor 130 may obtain a difference between the first score and the second score.

The processor 130 may obtain an estimated value of the difference between the first score and the second score by inputting the first voice data and the second voice data to the second model 20. The processor 130 may train the second model 20 to output the optimal and/or improved estimated value so as to minimize and/or reduce a difference between 1) the difference between the first score and the second score obtained in advance and 2) the estimated value of the difference between the first score and the second score. Accordingly, when the first voice data and the second voice data are input under the control of the processor 130, the trained second model 20 may obtain the optimized and/or improved estimated value of the difference between the first score and the second score.

For example, if the third model 40 is implemented as the ASR model, the processor 130 may obtain a voice reliability value of the first voice data and a second voice reliability value of the second voice data by inputting each of the first voice data and the second voice data to the ASR model. The voice reliability value may, for example, be a value showing how correctly the input voice data has recognized and converted into a text. The processor 130 may obtain a difference between the second voice reliability value and the first voice reliability value.

The processor 130 may obtain an estimated value of the difference between the first voice reliability value and the second voice reliability value by inputting the first voice data and the second voice data to the second model 20. The processor 130 may train the second model 20 to output the optimal and/or improved estimated value so as to minimize and/or reduce a difference between 1) the difference between the first voice reliability value and the second voice reliability value obtained in advance and 2) the estimated value of the difference between the first voice reliability value and the second voice reliability value. Accordingly, when the first voice data and the second voice data are input by the processor 130, the trained second model 20 may obtain the optimized and/or improved estimated value of the difference between the first voice reliability value and the second voice reliability value. The second model 20 may output a weight based on the optimal and/or improved estimated value of the difference between the first voice reliability value and the second voice reliability value. The weight may be a value obtained by applying a predefined mapping function to the estimated value.

The estimated value of the difference between the second voice reliability value and the first voice reliability value which is a negative value may refer, for example, to a high first voice reliability value, and the estimated value of the difference between the second voice reliability value and the first voice reliability value which is a positive value may refer, for example, to a high second voice reliability value. Accordingly, when the negative estimated value is output and a weight is output based on the output estimated value by the second model 20, the input data determination model 30 may determine (e.g., identify) the first voice data as data to be input to the third model 40. When the positive estimated value is output and a weight is output based on the output estimated value by the second model 20, the input data determination model 30 may determine (e.g., identify) the second voice data as data to be input to the third model 40.

In another example, if the third model 40 is implemented as the ASR model, the second model 20 may be trained based on a first word error rate (e.g., WER) of the first voice data and a second word error rate of the second voice data under the control of the processor 130. The word error rate may, for example, be a numerical value showing a degree of incorrect recognition of the input voice by the ASR model. For example, the word error rate may be a numerical value showing a degree of occurrence of word errors, when comparing a voice actually input and a result of recognition of the ASR model.

For example, the processor 130 may obtain the first word error rate of the first voice data and the second word error rate of the second voice data by inputting each of the first voice data and the second voice data to the ASR model. The processor 130 may obtain a difference value between the first word error rate and the second word error rate. The processor 130 may obtain an estimated value of the difference between the first word error rate and the second word error rate by inputting the first voice data and the second voice data to the second model 20. The processor 130 may train the second model 20 to output the optimal and/or improved estimated value so as to minimize and/or reduce a difference between 1) the difference value between the first word error rate and the second word error rate obtained in advance and 2) the estimated value of the difference between the first word error rate and the second word error rate. Accordingly, when the first voice data and the second voice data are input by the processor 130, the trained second model 20 may obtain the optimized and/or improved estimated value of the difference between the first word error rate and the second word error rate. The processor 130 may output an optimal and/or improved weight based on the obtained optimized and/or improved estimated value of the difference.

The estimated value of the difference between the first word error rate and the second word error rate which is a negative value may imply a high second word error rate, and the estimated value of the difference between the first word error rate and the second word error rate which is a positive value may imply a high first word error rate. Accordingly, when the negative estimated value is output and a weight is output based on the estimated value by the second model 20, the input data determination model 30 may determine (e.g., identify) the first voice data as data to be input to the third model 40. When the positive estimated value is output and a weight is output based on the output estimated value by the second model 20, the input data determination model 30 may determine (e.g., identify) the second voice data as data to be input to the third model 40.

In still another example, if the third model 40 is implemented as a wake-up model, the processor 130 may obtain a first possibility value for activation of a dialogue system by the wake-up model when inputting first voice data including a wake-up word to the wake-up model. The processor 130 may obtain a second possibility value for activation of a dialogue system by the wake-up model when inputting second voice data including a wake-up word to the wake-up model. The wake-up word may, for example, be a word that is able to activate a dialogue system which is artificial intelligence model providing an answer to a user voice stored in the memory 120 and may be expressed, for example, as a trigger word. The first and second possibility values may be numerical values of possibilities that the wake-up model recognizes the first and second voice data including the wake-up word and outputs a signal for activating the dialogue system.

The processor 130 may obtain the first possibility value and the second possibility value by inputting the first voice data and the second voice data each including the wake-up word to the wake-up model. The processor 130 may obtain a difference between the first possibility value and the second possibility value. The processor 130 may obtain an estimated value of the difference between the first possibility value and the second possibility value by inputting the first voice data and the second voice data to the second model 20. The processor 130 may train the second model 20 to output the optimal and/or improved estimated value so as to minimize and/or reduce a difference between 1) the difference between the first possibility value and the second possibility value obtained in advance and 2) the estimated value of the difference between the first possibility value and the second possibility value. Accordingly, the processor 130 may obtain the optimal and/or improved estimated value of the difference between the first possibility value and the second possibility value by inputting the first voice data and the second voice data to the trained second model 20.

The estimated value of the difference between the first possibility value and the second possibility value which is a negative value may imply a high second possibility value, and the estimated value of the difference between the first possibility value and the second possibility value which is a positive value may imply a high first possibility value. Accordingly, when the negative estimated value is output and a weight is output based on the estimated value by the second model 20, the input data determination model 30 may determine (e.g., identify) the first voice data as data to be input to the third model 40. When the positive estimated value is output and a weight is output based on the estimated value by the second model 20, the input data determination model 30 may determine (e.g., identify) the second voice data as data to be input to the third model 40.

In still another example, if the third model 40 is implemented as a wake-up model, the processor 130 may obtain a third possibility value for activation of a dialogue system by the wake-up model when inputting first voice data not including a wake-up word to the wake-up model. The processor 130 may obtain a fourth possibility value for activation of a dialogue system by the wake-up model when inputting second voice data not including a wake-up word to the wake-up model. The high third possibility value or fourth possibility value may imply that the speech recognition has not been correctly performed with respect to the first voice data or the second voice data, because the first voice data and the second voice data do not include the wake-up word.

The processor 130 may obtain a difference between the third possibility value and the fourth possibility value. The processor 130 may obtain an estimated value of the difference between the third possibility value and the fourth possibility value by inputting the first voice data and the second voice data not including the wake-up word to the second model 20. The processor 130 may train the second model 20 to output an optimal and/or improved estimated value so as to minimize and/or reduce a difference between 1) the difference between the third possibility value and the fourth possibility value obtained in advance and 2) the estimated value of the difference between the third possibility value and the fourth possibility value. Accordingly, the trained second model 20 may output the optimal and/or improved estimated value of the difference between the third possibility value and the fourth possibility value when the first voice data and the second voice data are input by the processor 130.

The estimated value of the difference between the third possibility value and the fourth possibility value which is a negative value may imply a high fourth possibility value and may imply that the speech recognition has been correctly performed with respect to the first voice data, compared to the second voice data. The estimated value of the difference between the third possibility value and the fourth possibility value which is a positive value may imply a high third possibility value and may imply that the speech recognition has been correctly performed with respect to the second voice data, compared to the first voice data. Accordingly, when the negative estimated value is output and a weight is output based on the output estimated value by the second model 20, the input data determination model 30 may determine (e.g., identify) the first voice data as data to be input to the third model 40. When the positive estimated value is output and a weight is output based on the output estimated value by the second model 20, the input data determination model 30 may determine (e.g., identify) the second voice data as data to be input to the third model 40.

For example, if the third model 40 is implemented as the ASR model or the wake-up model, the processor 130 may train the second model 20 based on the result obtained by inputting the first voice data and the second voice data to the third model 40.

Figure 4:
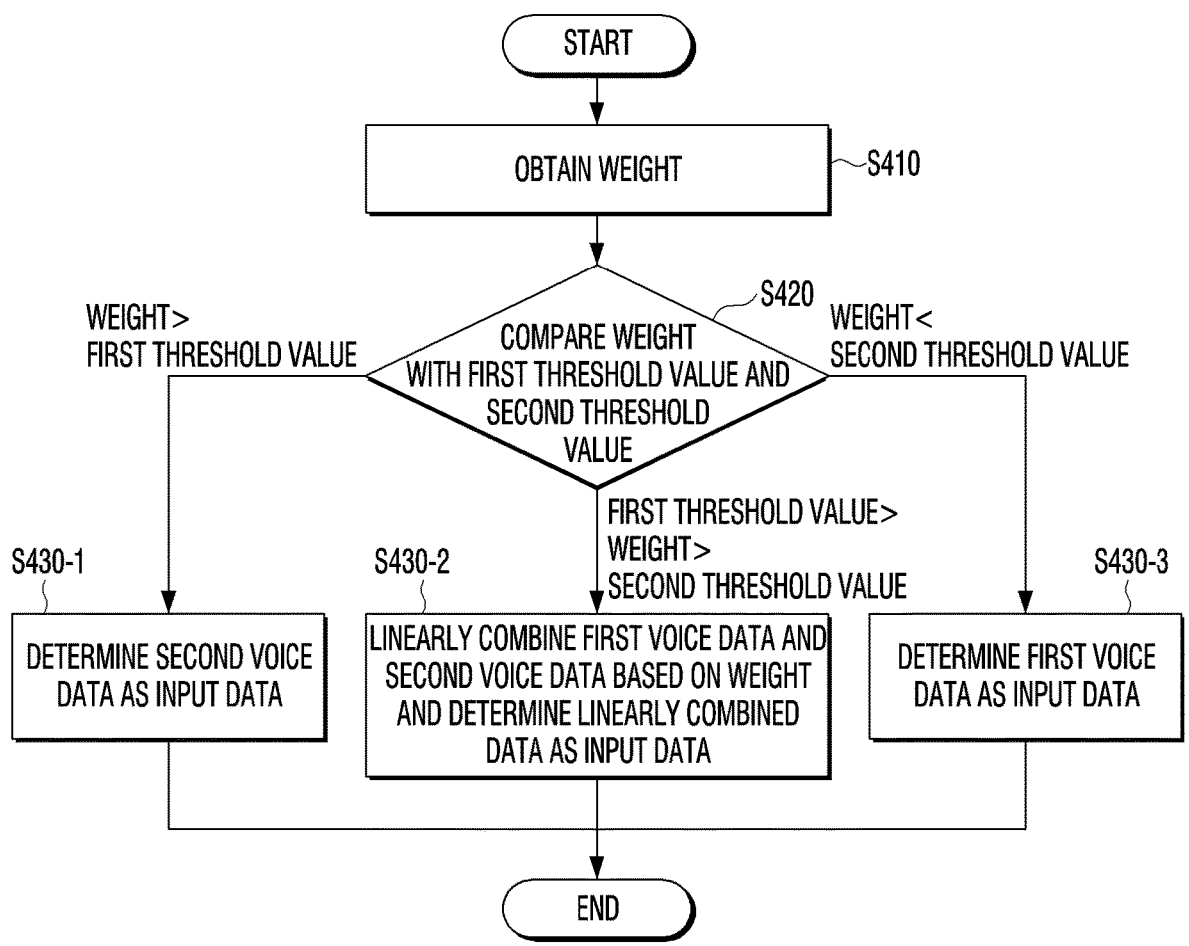

FIGS. 3 and 4 are flowcharts illustrating example processes of determining the input data using the obtained weight by the electronic device 100 according to an embodiment of the disclosure.

FIG. 3 is a flowchart illustrating an example process in which the electronic device 100 determines (e.g., identifies) data to be input to the third model by comparing a weight with a threshold, according to an embodiment of the disclosure. The electronic device 100 may obtain a weight based on the first voice data, the second voice data, and an estimated value of the error (S310). The process of obtaining the weight for minimizing and/or reducing the mean square error between the clean voice data corresponding to the first voice data and the input data has been described in detail above with reference to FIG. 1, and therefore the overlapped description may not be repeated here.

The electronic device 100 may determine (e.g., identify) whether the weight is greater than a threshold value (S320). The threshold value may be a predetermined value or a value derived by an experiment, but this is merely an example, and the threshold value may be changed by a user command.

When it is determined (e.g., identified) that the weight is greater than the threshold value, the electronic device 100 may determine (e.g., identify) the second voice data as the input data (S320-Y). For example, the weight greater than the threshold value means a small estimated value of the error which may imply a great reliability value of the second voice data. Accordingly, if the weight is greater than the threshold value, the electronic device 100 may determine (e.g., identify) the second voice data as the input data to be input to the third model.

On the other hand, when it is determined (e.g., identified) that the weight is less than the threshold value, the electronic device 100 may determine (e.g., identify) the first voice data as the input data (S320-N). For example, the weight less than the threshold value may imply a large estimated value of the error, which may imply a small reliability value of the second voice data. Accordingly, if the weight is less than the threshold value, the electronic device 100 may determine (e.g., identify) the first voice data as the input data to be input to the third model.

FIG. 4 is a flowchart illustrating an example process in which the electronic device 100 determines (e.g., identifies) data to be input to the third model by comparing the weight with first and second threshold values, according to an embodiment of the disclosure. The electronic device 100 may obtain a weight for minimizing and/or reducing the mean square error between the clean voice data corresponding to the first voice data and the input data (S410). The embodiment for obtaining the weight has been described in detail above with reference to FIG. 1, and therefore the overlapped description may not be repeated here.

The electronic device 100 may compare the weight value with a first threshold value and a second threshold value (S420). The first threshold value may be a predetermined value greater than the second threshold value. However, this is merely an example, and the first threshold value and the second threshold value may be changed according to a user command.

If the weight value is greater than the first threshold value, the electronic device 100 may determine (e.g., identify) the second voice data as the input data to be input to the third model (S430-1). On the other hand, if the weight value is less than the second threshold value, the electronic device 100 may determine (e.g., identify) the first voice data as the input data to be input to the first model (S430-3).

If the weight is less than the first threshold value and greater than the second threshold value, the electronic device 100 may linearly combine the first voice data and the second voice data based on the weight, and determine (e.g., identify) the linearly combined value as the input data input to the third model (S430-2). In other words, the electronic device 100 may linearly combine the first voice data and the second voice data and determine (e.g., identify) the linearly combined value as the input data, except for when the weight is greater than the first threshold value or less than the second threshold value.

Figure 5:
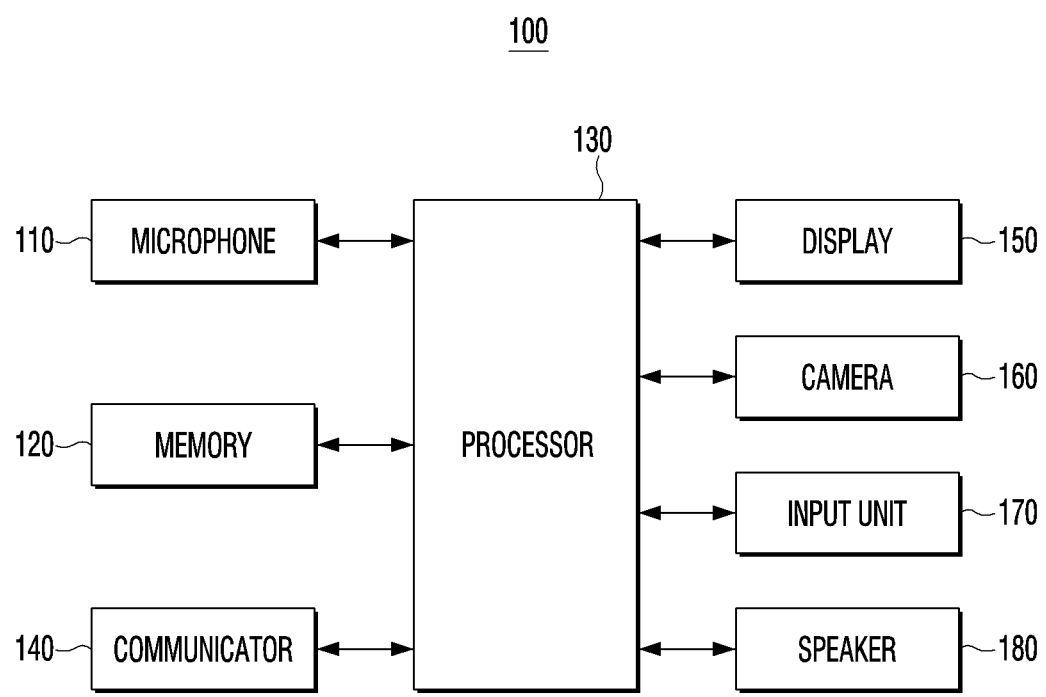
FIG. 5 is a block diagram illustrating an example configuration of the electronic device according to an embodiment.

FIG. 5 is a block diagram illustrating an example configuration of the electronic device 100 according to an embodiment of the disclosure. Referring to FIG. 5, the electronic device 100 may include the microphone 110, the memory 120, the processor (e.g., including processing circuitry) 130, a communicator (e.g., including communication circuitry) 140, a display 150, a camera 160, an input unit (e.g., including input circuitry) 170, and a speaker 180. The microphone 110, the memory 120, and the processor 130 have been described above with reference to FIG. 1, and therefore the overlapped description may not be repeated here.

The communicator 140 includes various communication circuitry and may execute communication with a server (not shown) or an external device (not shown). For example, the processor 130 may transmit or receive various pieces of data or information to or from a server (not shown) or an external device (not shown) connected via the communicator 140. For example, the communicator 140 may receive learning data of various models stored in the memory 120 from an external server. Accordingly, the processor 130 may train various models based on the learning data received via the communicator 140.

The communicator 140 may include various communication modules to execute the communication with an external device. In an example, the communicator 140 may include wireless communication modules, each including various communication circuitry, and, for example, and without limitation, include a cellular communication module using at least one of LTE, LTE Advance (LTE-A), code division multiple access (CDMA), wideband CDMA (WCDMA), universal mobile telecommunications system (UMTS), Wireless Broadband (WiBro), 5th generation (5G), global system for mobile communications (GSM), or the like. In another example, the wireless communication module may, for example, include at least one of wireless fidelity (Wi-Fi), Bluetooth, Bluetooth Low Energy (BLE), and Zigbee.

The display 150 may be implemented, for example, as a liquid crystal display panel (LCD), organic light emitting diodes (OLED), or the like and may also be implemented as a flexible display or a transparent display, in some cases. The display 160 may be implemented as a touch screen with a touch panel. However, there is no limitation to the above implementation, and the display 150 may be differently implemented according to the type of the electronic device 100.

The camera 160 may, for example, include a component for obtaining one or more pieces of image data of surroundings of the electronic device 100. The processor 130 may determine (e.g., identify) input data to be input to a specific model based on the one or more pieces of image data obtained by the camera 160. This embodiment will be described in greater detail below. The camera may be variously implemented as an RGB camera, a 3D camera, or a depth camera, and may be located outside the electronic device 100 and electrically connected thereto.

The input unit 170 may include various input circuitry and the processor 140 may receive a user command for controlling operations of the electronic device 100 via the input unit 170. The input unit 170 may include various input circuitry, such as, for example, and without limitation, a touch sensor, a (digital) pen sensor, a pressure sensor, a key, a microphone, or the like. The touch sensor may be, for example, at least one of an electrostatic type, a pressure-sensitive type, an infrared type, or an ultrasonic type.

The speaker 180 may be a component outputting various alarms or voice messages, in addition to various pieces of audio data subjected to various processing operations such as decoding, amplification, noise filtering by an audio processor (not shown). For example, the speaker 180 may output input data to be input to the third model under the control of the processor 130. In addition, the speaker 180 may output a result (for example, response message corresponding to the first voice data) output by the third model under the control of the processor 130.

Figure 6:
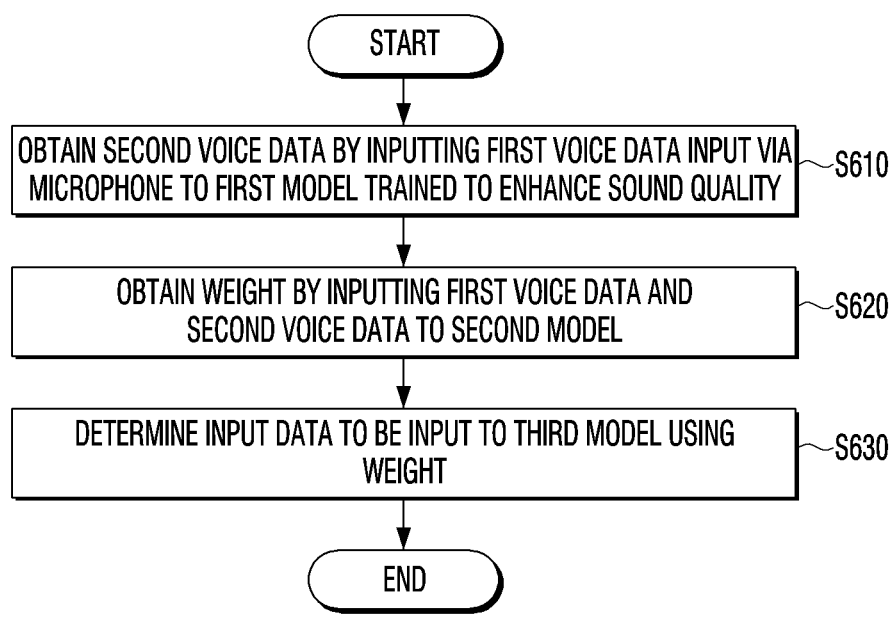
FIG. 6 is a flowchart illustrating an example method for controlling the electronic device according to an embodiment.

FIG. 6 is a flowchart illustrating an example method for controlling the electronic device 100 according to an embodiment of the disclosure.

The electronic device 100 may obtain second voice data by inputting first voice data input via the microphone 110 to a first model trained to enhance sound quality (S610). The first model may be a model that executes an algorithm for filtering out a noise and the like of the first voice data and outputs the second voice data. In addition, the first model may be a neural network model trained based on the first voice data, the second voice data, and the clean voice data corresponding to the first voice data. For example, the first model may be a neural network model trained to output the second voice data similar to the clean voice data corresponding to the first voice data, when the first voice data is input.

The electronic device 100 may obtain a weight by inputting the first voice data and the second voice data to the second model (S620).

In an embodiment of the disclosure, the electronic device 100 may obtain an estimated value of a mean square error of the second voice data and the clean voice data corresponding to the first voice data by inputting the first voice data and the second voice data to the second model. The formula related thereto has been described in detail with reference to FIGS. 1, 2A and 2B, and therefore the overlapped description will not be repeated here. In addition, the electronic device 100 may obtain a weight based on the first voice data, the second voice data, and the obtained estimated value of the mean square error by the second model. The weight may be a value for minimizing and/or reducing the mean square error between the clean voice data corresponding to the first voice data and the input data to be input to the third model.

In another embodiment of the disclosure, the electronic device 100 may obtain an estimated value of a difference between a first score and a second score by inputting the first voice data and the second voice data to the second model. The first score and the second score may be data obtained when inputting each of the first voice data and the second voice data to the third model. For example, if the third model is an ASR model, the score may be a voice reliability value or a WER, and if the third model is a wake-up model, the score may be a possibility value for the activation of the dialogue system. The electronic device 100 may obtain a weight by applying a predefined mapping function to the estimated value of the difference between the first score and the second score by the second model.

The electronic device 100 may determine (e.g., identify) the input data to be input to the third model using the obtained weight (S630). In an embodiment, the electronic device 100 may linearly combine the first voice data and the second voice data based on the weight and determine (e.g., identify) the linearly combined value as the input data. In another example, if the weight is less than a threshold value, the electronic device 100 may determine (e.g., identify) the first voice data as the input data, and if the weight is greater than the threshold value, the electronic device 100 may determine (e.g., identify) the second voice data as the input data.

In still another example, if the weight is greater than a second threshold value and less than a first threshold, the electronic device 100 may linearly combine the first voice data and the second voice data based on the weight and determine (e.g., identify) the linearly combined value as the input data. If the weight is less than the second threshold value, the electronic device 100 may determine (e.g., identify) the first voice data as the input data, and if the weight is greater than the first threshold value, the electronic device 100 may determine (e.g., identify) the second voice data as the input data. The first threshold value may be a value greater than the second threshold value.

Hereinabove, an embodiment in which the electronic device 100 determines (e.g., identifies) the voice data to be input to the third model based on the first voice data and the second voice data has been described, but this is merely an example. For example, in still another embodiment of the disclosure, the electronic device 100 may determine (e.g., identify) input data to be input to a specific model or image data to be displayed on a display based on first image data obtained via the camera and second image data obtained by applying an algorithm for enhancing image quality to the first image data.

For example, the electronic device 100 may obtain the second image data by inputting the first image data input via the camera to a first model trained to enhance image quality. In addition, the electronic device 100 may obtain an estimated value of a mean square error between the second image data and clean image data corresponding to the first image data by inputting the first image data and the second image data to a second model. The clean image data may include image data captured in a clean environment where no effect is received form the surrounding environment.

The electronic device 100 may obtain a weight based on the first image data, the second image data, and the estimated value of the error. The electronic device 100 may determine (e.g., identify) input data to be input to a third model using at least one of the first image data, the second image data, and the weight. The third model may be implemented as an image classifier model or the like, but this is merely an example, and the third model may be variously implemented as a model that is able to edit images and the like.

The electronic device 100 may train the third model based on the clean image data corresponding to the first image data and the second image data. For example, the electronic device 100 may obtain a mean square error between the clean image data corresponding to the first image data and the second image data. In addition, the electronic device 100 may obtain an estimated value of the mean square error between the second image data and the clean image data corresponding to the first image data by inputting the first image data and the second image data to the second model. The electronic device 100 may train the second model to minimize and/or reduce a difference between 1) the mean square error between the clean image data corresponding to the first image data and the second image data and 2) the estimated value of the mean square error.

As described above, according to the embodiments of the disclosure, a user may more efficiently use a speech recognition system, because the electronic device determines (e.g., identifies) data to be input to a specific model based on voice data and data obtained by applying an algorithm for enhancing sound quality to the voice data.

The accompanying drawings of the disclosure are not for limiting the technologies disclosed in the disclosure to a specific embodiment, but they should be interpreted to include all modifications, equivalents and/or alternatives of the embodiments of the disclosure. In relation to explanation of the drawings, similar reference numerals may be used for similar elements.

In this disclosure, the terms such as "comprise", "may comprise", "consist of", or "may consist of" are used herein to designate a presence of corresponding features (e.g., constituent elements such as number, function, operation, or part), and not to preclude a presence of additional features.

In this disclosure, expressions such as "A or B", "at least one of A [and/or] B,", or "one or more of A [and/or] B," include all possible combinations of the listed items. For example, "A or B", "at least one of A and B,", or "at least one of A or B" includes any of (1) at least one A, (2) at least one B, or (3) at least one A and at least one B.

The expressions "first," "second" and the like used in the disclosure may denote various elements, regardless of order and/or importance, and may be used to distinguish one element from another, and does not limit the elements.

If it is described that a certain element (e.g., first element) is "operatively or communicatively coupled with/to" or is "connected to" another element (e.g., second element), it should be understood that the certain element may be connected to the other element directly or through still another element (e.g., third element). On the other hand, if it is described that a certain element (e.g., first element) is "directly coupled to" or "directly connected to" another element (e.g., second element), it may be understood that there is no element (e.g., third element) between the certain element and the another element.

Also, the expression "configured to" used in the disclosure may be interchangeably used with other expressions such as "suitable for," "having the capacity to," "designed to," "adapted to," "made to," and "capable of," depending on cases. Meanwhile, the expression "configured to" does not necessarily refer to a device being "specifically designed to" in terms of hardware. Instead, under some circumstances, the expression "a device configured to" may refer to the device being "capable of" performing an operation together with another device or component. For example, the phrase "a unit or a processor configured (or set) to perform A, B, and C" may refer, for example, and without limitation, to a dedicated processor (e.g., an embedded processor) for performing the corresponding operations, a generic-purpose processor (e.g., a central processing unit (CPU) or an application processor), or the like, that can perform the corresponding operations by executing one or more software programs stored in a memory device.

An electronic device according to the embodiments of the disclosure may include, for example, and without limitation, at least one of a smartphone, a table PC, a desk-top PC, a laptop PC, a netbook computer, a server, a PDA, a medical device, a wearable device, or the like. In some embodiments, the electronic device may include, for example, and without limitation, at least one of a television, a refrigerator, an air conditioner, an air purifier, a set-top box, a media box (e.g., Samsung HOMESYNC™, APPLE TV™, or GOOGLE TV™), or the like.

Various embodiments of the disclosure may be implemented as software including instructions stored in machine (e.g., computer)-readable storage media. The machine is a device which invokes instructions stored in a storage medium and is operated according to the invoked instructions, and may include an electronic device (e.g., electronic device 100) according to the disclosed embodiments. In a case where the instruction is executed by a processor, the processor may execute a function corresponding to the instruction directly or using other elements under the control of the processor. The instruction may include a code made by a compiler or a code executable by an interpreter. The machine-readable storage medium may be provided in a form of a non-transitory storage medium. Here, the "non-transitory storage medium" is tangible and may not include signals, and it does not distinguish that data is semi-permanently or temporarily stored in the storage medium. For example, the "non-transitory storage medium" may include a buffer storing data temporarily.

According to an embodiment, the methods according to various embodiments disclosed in this disclosure may be provided to be included in a computer program product. The computer program product may be exchanged between a seller and a purchaser as a commercially available product. The computer program product may be distributed in the form of a machine-readable storage medium (e.g., compact disc read only memory (CD-ROM)) or distributed online through an application store (e.g., PlayStore™). In a case of the on-line distribution, at least a part of the computer program product (for example, downloadable app) may be at least temporarily stored or temporarily generated in a storage medium such as a memory of a server of a manufacturer, a server of an application store, or a relay server.

Each of the elements (e.g., a module or a program) according to various embodiments described above may include a single entity or a plurality of entities, and some sub-elements of the abovementioned sub-elements may be omitted or other sub-elements may be further included in various embodiments. Alternatively or additionally, some elements (e.g., modules or programs) may be integrated into one entity to perform the same or similar functions performed by each respective element prior to integration. Operations performed by a module, a program, or other elements, in accordance with various embodiments, may be performed sequentially, in a parallel, repetitive, or heuristically manner, or at least some operations may be performed in a different order, omitted, or may add a different operation.

While the disclosure has been illustrated and described with reference to various example embodiments, it will be understood that the various example embodiments are intended to be illustrative, not limiting. It will be understood by those of ordinary skill in the art that various changes in form and detail may be made without departing from the true spirit and full scope of the disclosure, including the appended claims and their equivalents.

What is claimed is:

1. An electronic device comprising:
a microphone;
a memory storing at least one instruction; and
a processor configured to execute the at least one instruction,
wherein the processor is configured to:
obtain second voice data by inputting first voice data input via the microphone to a first model trained to enhance sound quality,
obtain a weight by inputting the first voice data and the second voice data to a second model, and
identify input data to be input to a third model using the weight, at least by:
based on the weight being greater than a first threshold value, identify the second voice data as the input data,
based on the weight being greater than a second threshold value and less than the first threshold value, linearly combine the first voice data and the second voice data based on the weight and identify the linearly combined value as the input data, and
based on the weight being less than the second threshold value, identify the first voice data as the input data,
wherein the first threshold value is a value greater than the second threshold value.

2. The device according to claim 1, wherein the processor is further configured to obtain the weight using the first voice data, the second voice data, and an estimated value of an error between the second voice data and clean voice data corresponding to the first voice data.

3. The device according to claim 1, wherein the processor is further configured to: linearly combine the first voice data and the second voice data based on the weight; and identify the linearly combined value as the input data.

4. The device according to claim 1, wherein the processor is further configured to identify one of the first voice data and the second voice data as the input data based on the weight.

5. The device according to claim 4, wherein the processor is further configured to:
based on the weight being greater than a threshold value, identify the second voice data as the input data, and
based on the weight being less than the threshold value, identify the first voice data as the input data.

6. The device according to claim 1, wherein the third model is at least one of a wake-up model or an automatic speech recognition model.

7. The device according to claim 1, wherein the processor is further configured to: train the first model and the second model based on the first voice data, clean voice data corresponding to the first voice data, and the second voice data.

8. The device according to claim 1, wherein the processor is further configured to: obtain a first score corresponding to the first voice data and obtain a second score corresponding to the second voice data by inputting each of the first voice data and the second voice data to the third model, and
train the second model based on the first voice data, the second voice data, the first score, and the second score.

9. The device according to claim 8, wherein the processor is configured to:
obtain an estimated value of a difference between the first score and the second score by inputting the first voice data and the second voice data to the second model, and
obtain the weight based on the estimated value of the difference between the first score and the second score.

10. A method for controlling an electronic device comprising a microphone, the method comprising:
obtaining second voice data by inputting first voice data input via the microphone to a first model trained to enhance sound quality;
obtaining a weight by inputting the first voice data and the second voice data to a second model; and
identifying input data to be input to a third model using the weight,
wherein the identifying comprises:
based on the weight being greater than a first threshold value, identifying the second voice data as the input data;
based on the weight being greater than a second threshold value and less than the first threshold value, linearly combining the first voice data and the second voice data based on the weight and identifying the linearly combined value as the input data; and
based on the weight being less than the second threshold value, identifying the first voice data as the input data,
wherein the first threshold value is a value greater than the second threshold value.

11. The method according to claim 10, wherein the obtaining comprises obtaining the weight based on the first voice data, the second voice data, and an estimated value of an error between the second voice data and clean voice data corresponding to the first voice data.

12. The method according to claim 10, wherein the identifying comprises linearly combining the first voice data and the second voice data based on the weight and identifying the linearly combined value as the input data.

13. The method according to claim 10, wherein the identifying comprises identifying one of the first voice data and the second voice data as the input data based on the weight.

14. The method according to claim 13, wherein the identifying comprises:
based on the weight being greater than a threshold value, identifying the second voice data as the input data; and
based on weight being less than the threshold value, identifying the first voice data as the input data.

15. The method according to claim 10, wherein the third model is at least one of a wake-up model or an automatic speech recognition model.

16. The method according to claim 10, further comprising:
training the first model and the second model based on the first voice data, clean voice data corresponding to the first voice data, and the second voice data.

17. The method according to claim 10, further comprising:
obtaining a first score corresponding to the first voice data and obtaining a second score corresponding to the second voice data by inputting each of the first voice data and the second voice data to the third model; and
training the second model based on the first voice data, the second voice data, the first score, and the second score.

18. The method according to claim 17, wherein the obtaining a weight comprises:
obtaining an estimated value of a difference between the first score and the second score by inputting the first voice data and the second voice data to the second model; and
obtaining the weight based on the estimated value of the difference between the first score and the second score.

* * * * *